United States Patent
Bliss et al.

(10) Patent No.: US 6,507,546 B1
(45) Date of Patent: Jan. 14, 2003

(54) 2,2,1 ASYMMETRIC PARTIAL RESPONSE TARGET IN A SAMPLED AMPLITUDE READ CHANNEL FOR DISK STORAGE SYSTEMS

(75) Inventors: William G. Bliss, Thornton; Sian She, Broomfield; Lisa C. Sundell, Boulder, all of CO (US)

(73) Assignee: Cirrus Logic, Incorporated, Austin, TX (US)

( * ) Notice: Subject to any disclaimer, the term of this patent is extended or adjusted under 35 U.S.C. 154(b) by 0 days.

(21) Appl. No.: 09/439,560

(22) Filed: Nov. 12, 1999

(51) Int. Cl.$^7$ .............................................. G11B 7/005
(52) U.S. Cl. ....................... 369/59.22; 360/65; 375/232
(58) Field of Search .......................... 369/59.21, 59.22, 369/47.35; 360/65; 375/232

(56) References Cited

U.S. PATENT DOCUMENTS

| | | | |
|---|---|---|---|
| 5,287,385 A | 2/1994 | Sugawara et al. .............. | 375/12 |
| 5,291,499 A * | 3/1994 | Behrens et al. ................ | 371/43 |
| 5,585,975 A | 12/1996 | Bliss ............................ | 360/65 |
| 5,844,738 A | 12/1998 | Behrens et al. ................ | 360/44 |
| 5,872,668 A | 2/1999 | Muto ........................... | 360/65 |
| 5,886,844 A | 3/1999 | Shimizu ........................ | 360/65 |
| 5,926,490 A * | 7/1999 | Reed et al. .................... | 360/46 |
| 6,249,398 B1 * | 6/2001 | Fisher et al. ................... | 360/65 |

* cited by examiner

Primary Examiner—W. R. Young
Assistant Examiner—Gautam R. Patel
(74) Attorney, Agent, or Firm—Dan Shifrin; Howard Sheerin

(57) ABSTRACT

A sampled amplitude read channel is disclosed for reading data recorded on a disk storage medium by detecting an estimated data sequence from a sequence of read signal sample values generated by an analog read signal emanating from a read head positioned over the disk storage medium. A sampling device samples the analog read signal to generate the read signal sample values, and a discrete-time equalizer equalizes the read signal sample values according to an asymmetric partial response target comprising a dipulse response of the form:

$$(\ldots, 0, 0, +X_0, +X_1, -X_2, -X_3, -X_4, 0, 0, \ldots)$$

where $X_0-X_4$ are non-zero to thereby generate equalized sample values. In the embodiments disclosed herein, $X_0-X_4$ are 2,2,1,2,1 respectively. A discrete-time sequence detector detects the estimated data sequence from the equalized sample values.

13 Claims, 6 Drawing Sheets

2,2,1 ASYMMETRIC PARTIAL RESPONSE TARGET IN A SAMPLED AMPLITUDE READ CHANNEL FOR DISK STORAGE SYSTEMS

CROSS REFERENCE TO RELATED APPLICATIONS AND PATENTS

This application is related to U.S. Pat. No. 5,585,975 entitled "EQUALIZATION FOR SAMPLE VALUE ESTIMATION AND SEQUENCE DETECTION IN A SAMPLED AMPLITUDE READ CHANNEL," 5,926,490 entitled "SAMPLED AMPLITUDE READ CHANNEL EMPLOYING A REMOD/DEMOD SEQUENCE DETECTOR GUIDED BY AN ERROR SYNDROME," 5,771,127 entitled "A SAMPLED AMPLITUDE READ CHANNEL EMPLOYING INTERPOLATED TIMING RECOVERY AND A REMOD/ DEMOD SEQUENCE DETECTOR," 5,838,738 entitled "CODING TO IMPROVE TIMING RECOVERY IN A SAMPLED AMPLITUDE READ CHANNEL," and 5,291,499 entitled "METHOD AND APPARATUS FOR REDUCED-COMPLEXITY VITERBI-TYPE SEQUENCE DETECTORS." The above-named U.S. patents are incorporated herein by reference.

FIELD OF INVENTION

The present invention relates to data transmission in communication systems, such as the recording and reproduction of binary data in disk storage systems for digital computers, particularly to a sampled amplitude read channel employing a 2, 2, 1 asymmetric partial response target which requires less equalization to attain the desired dipulse response.

BACKGROUND OF THE INVENTION

Disk storage systems (magnetic and optical disk drives) are essentially communication systems wherein the media, heads, and read/write electronics constitute the communication channel. Disk storage systems have transitioned from simple analog pulse detector read channels to more sophisticated sampled amplitude read channels comprising complex sequence detectors operating on synchronous, discrete-time samples of the read signal. Sequence detectors generate an estimated data sequence by evaluating several read signal sample values in context to estimate the most likely recorded data sequence to have generated the read signal sample values. A Viterbi sequence detector, for example, selects an estimated data sequence which minimizes a Euclidean distance between the read signal samples and ideal sample values corresponding to the possible recorded data sequences. The accuracy of a sequence detector in selecting the correct estimated data sequence depends on the magnitude and character of the noise in the read signal.

A Viterbi sequence detector is a maximum likelihood sequence detector (optimal) only if the noise is statistically independent with a Gaussian probability distribution. This is typically not the case in disk storage systems due to the equalizers in the read channel which correlate the noise in the read signal. The read signal is typically equalized to conform to a desired partial response (PR) which means that an isolated symbol will generate a particular dipulse shape which minimizes intersymbol interference. The recording channel's natural dipulse response (unequalized response) is typically very wide and possibly asymmetric. If the read signal were not equalized, there would be several samples in the dipulse response resulting in an unwieldy large state transition diagram for the sequence detector. For this reason the read signal is equalized to reduce the number of samples in the dipulse response, but the noise correlating effect of the channel equalizer's degrades the performance of the sequence detector.

There are various techniques employed in the prior art which attempt to compensate for the undesirable noise correlating effect of the channel equalizers. For example, it is known to select a wider PR target (e.g., EPR4 over PR4) so that less equalization is required to match the channel's response to the target response. As described above, however, a wider dipulse response increases the cost and complexity of the resulting state transition diagram for the sequence detector. And although the noise correlating effect is reduce, it is not eliminated.

Other techniques have also been employed, such as noise predictive algorithms which augment the sequence detector by incorporating the noise correlating effect of the channel equalizers into the sequence detector's state transition diagram, but this increases the cost and complexity of the sequence detector. Noise whitening filters may also be employed in post processors which attempt to whiten the noise in the read signal before detecting and correcting the dominant error events associated with the sequence detector. Although these techniques improve performance, further gains are attainable.

There is, therefore, a need to compensate for the noise correlating effect of channel equalizers in a sampled amplitude read channel for disk storage systems. In particular, there is a need to minimize the noise correlating effect of the channel equalizers in order to enhance the sequence detector's performance without significantly increasing the cost and complexity of the read channel.

SUMMARY OF THE INVENTION

The present invention may be regarded as a sampled amplitude read channel for reading data recorded on a disk storage medium by detecting an estimated data sequence from a sequence of read signal sample values generated by sampling an analog read signal emanating from a read head positioned over the disk storage medium. A sampling device samples the analog read signal to generate the read signal sample values, and a discrete-time equalizer equalizes the read signal sample values according to an asymmetric partial response target comprising a dipulse response of the form:

$$(\ldots, 0, 0, +X_0, +X_1, -X_2, -X_3, -X_4, 0, 0, \ldots)$$

where $X_0$–$X_4$ are non-zero to thereby generate equalized sample values. In the embodiments disclosed herein, $X_0$–$X_4$ are 2, 2, 1, 2, 1 respectively. A discrete-time sequence detector detects the estimated data sequence from the equalized sample values.

The present invention may also be regarded as a method of reading data recorded on a disk storage medium by detecting an estimated data sequence from a sequence of read signal sample values generated by sampling an analog read signal emanating from a read head positioned over the disk storage medium. The analog read signal is sampled to generate the read signal sample values which are equalized according to an asymmetric partial response target comprising a dipulse response of the form:

$$(\ldots, 0, 0, +X_0, +X_1, -X_2, -X_3, -X_4, 0, 0, \ldots)$$

where $X_0$–$X_4$ are non-zero to thereby generate equalized sample values.

In the embodiments disclosed herein, $X_0$–$X_4$ are 2, 2, 1, 2, 1 respectively. An estimated data sequence is detected from the equalized sample values.

BRIEF DESCRIPTION OF THE DRAWINGS

The above and other aspects and advantages of the present invention will be better understood by reading the following detailed description of the invention in conjunction with the drawings, wherein.

DETAILED DESCRIPTION OF EMBODIMENTS

Partial Response Systems

Partial response (PR) signaling refers to a particular method for transmitting symbols represented as analog pulses through a communication medium. The benefit is that at the signaling instances (baud rate) there is no intersymbol interference (ISI) from other pulses except for a controlled amount from immediately adjacent, overlapping pulses. Allowing the pulses to overlap in a controlled manner leads to an increase in the symbol rate (linear recording density) without losing performance in terms of signal-to-noise ratio (SNR).

Figure 1A:
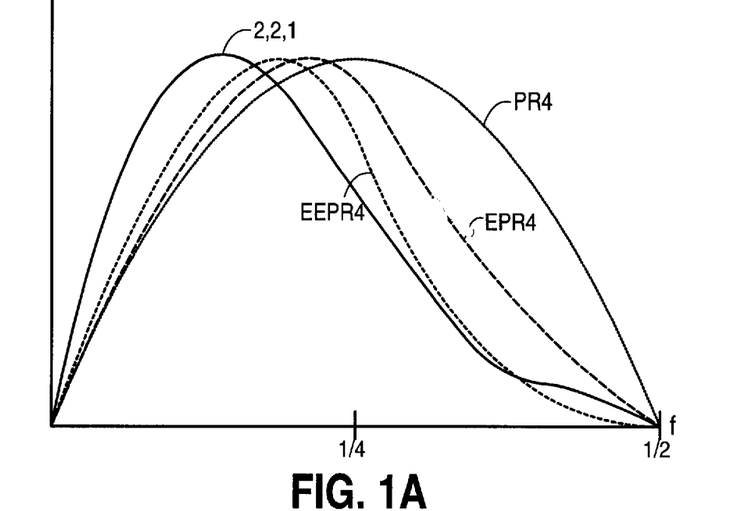
FIG. 1A shows the frequency response for a 2, 2, 1 PR target relative to the conventional PR4, EPR4 and EEPR4 targets.
Figure 1B:
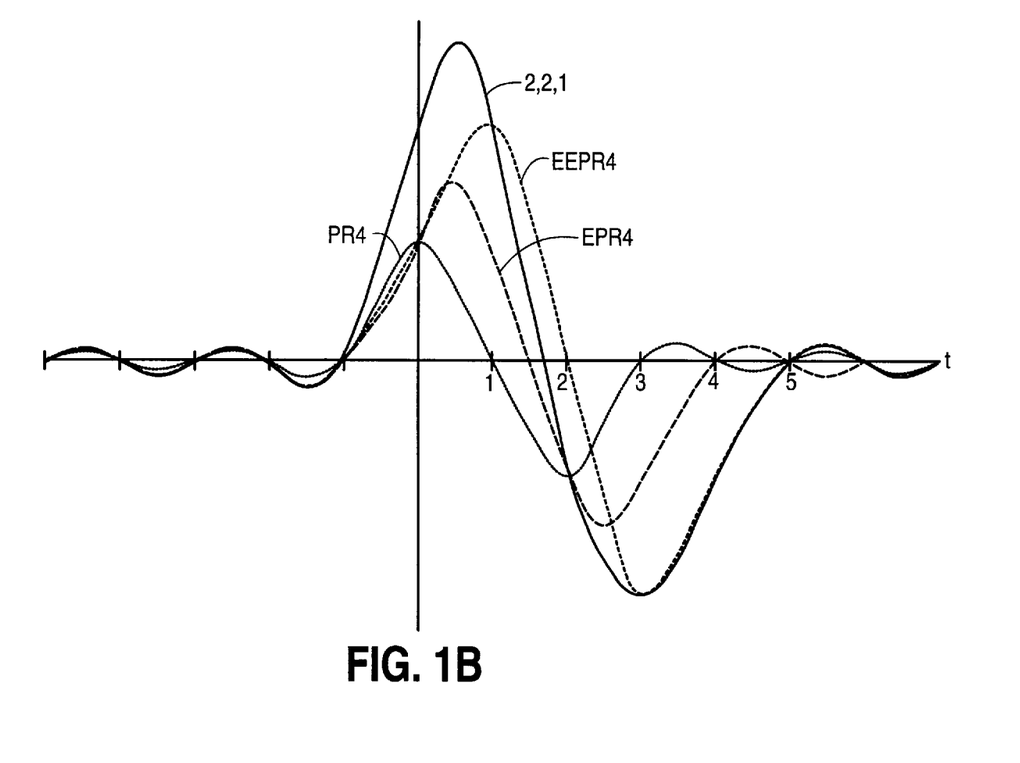
FIG. 1B shows the dipulse responses for the 2, 2, 1 and PR4, EPR4 and EEPR4 targets of FIG. 1A.

PR channels are characterized by the polynomials $$(1-D)(1+D)^n$$

where D represents a delay of one symbol period and n is an integer. For n=1, 2, 3, the conventional PR channels are referred to as PR4, EPR4 and EEPR4, with their respective frequency responses shown in FIG. 1A. The channel's dipulse response, the response to an isolated symbol, characterizes the transfer function of the system (the output for a given input). With a binary "1" bit modulating a positive dipulse response and a binary "0" bit modulating a negative dipulse response, the output of the channel is a linear combination of time shifted dipulse responses. The dipulse response for a PR4 channel $(1-D^2)$ is shown as a dotted line in FIG. 1B. Notice that at the symbol instances (baud rate), the dipulse response is zero except at times t=0 and t=2. Thus, the linear combination of time shifted PR4 dipulse responses will result in zero ISI at the symbol instances except where immediately adjacent pulses overlap.

With the PR4 dipulse samples normalized to (+1, 0 −1) it should be apparent that the linear combination of time shifted PR4 dipulse responses will result in a channel output of +2, 0, or −2 at the symbol instances depending on the binary input sequence. The output of the channel can therefore be characterized as a state machine driven by the binary input sequence, and conversely, the input sequence can be estimated or demodulated by running the signal samples at the output of the channel through an "inverse" state machine. Because noise will obfuscate the signal samples, the inverse state machine is actually implemented as a trellis sequence detector which computes a most likely input sequence associated with the signal samples (i.e., the sequence through a trellis that is closest to the signal samples in Euclidean space).

The number of states in the state transition diagram increases exponentially as the number of samples in the dipulse response increases. Thus, lower order read channels (e.g., PR4) are significantly less complex and less costly to implement as compared to higher order read channels. However, as described above, lower order read channels require more equalization to match the channel's response to the PR target which degrades the performance of the sequence detector.

The applicants have discovered a new PR target which has five samples in the dipulse response but which requires significantly less equalization than a conventional EEPR4 target which has the same number of samples in the dipulse response (i.e., similar in complexity and cost). The frequency response for this new PR target, referred to as a 2, 2, 1 PR target, is shown in FIG. 1A with its corresponding dipulse response shown in FIG. 1B. The 2, 2, 1 dipulse response is of the form $$(\ldots, 0, 0, +X_0, +X_1, -X_2, -X_3, -X_4, 0, 0, \ldots)$$

where $X_0$–$X_4$ are non-zero values. In the embodiments disclosed herein, $X_0$–$X_4$ are 2, 2, 1, 2, 1 respectively; however, the values for $X_0$–$X_4$ could vary as long as the dipulse response takes on a similar shape as shown in FIG. 1B. Notice that the conventional PR4, EPR4 and EEPR4 dipulse responses in FIG. 1B are symmetric, whereas the 2, 2, 1 dipulse response is asymmetric. The particular shape of the 2, 2, 1 dipulse response matches more closely the natural dipulse response of the channel and thus less equalization is required.

Data Format

Figure 2A:
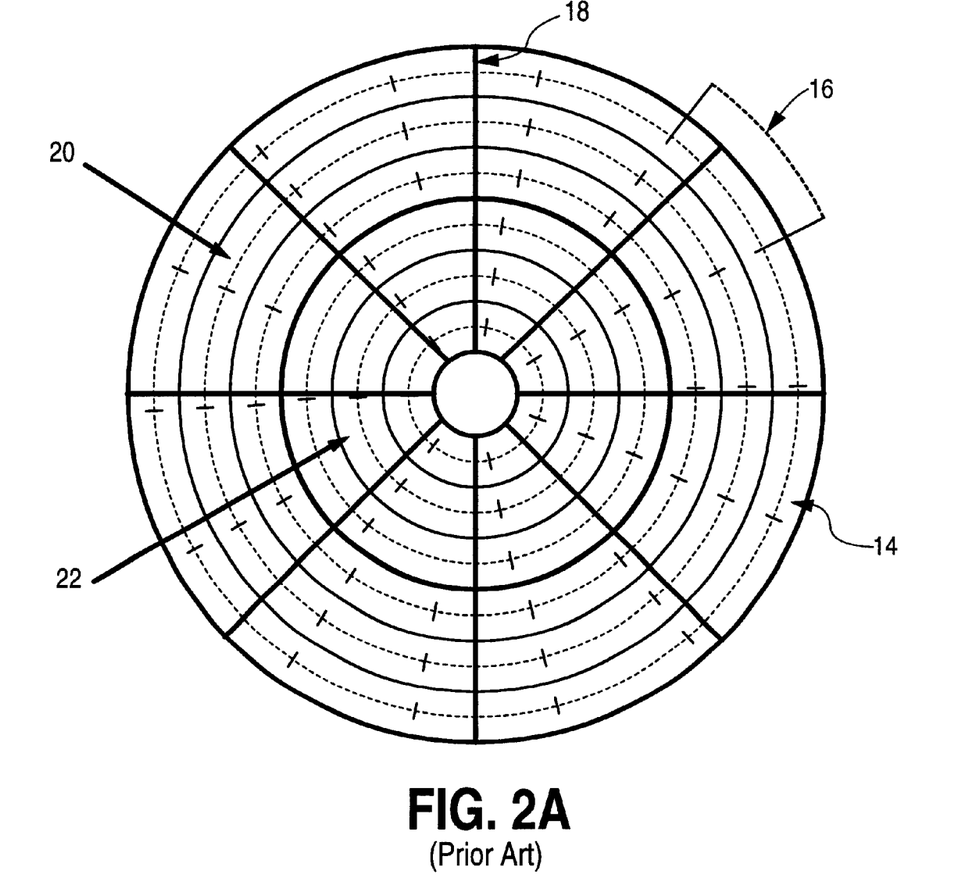
FIG. 2A shows a typical data format for a magnetic disk storage medium, comprising a plurality of concentric data tracks grouped in predefined zones, where each data track is partitioned into a number of data sectors.

FIG. 2A shows a conventional data format of a magnetic disk storage medium comprising a series of concentric, radially spaced data tracks 14, wherein each data track 14 comprises a plurality of data sectors 16 with embedded servo wedges 18. A servo controller (not shown) processes the servo data in the servo wedges 18 and, in response, positions a read/write head over a selected data track. Additionally, the servo controller processes servo bursts within the servo wedges 18 to keep the head aligned over a centerline of the selected track while writing and reading data. The format of the servo wedges 18 includes a preamble and a sync mark, similar to the user data sectors 16 described below with reference to FIG. 2B.

Zoned recording is a technique known in the art for increasing the storage density by recording the user data at different rates in predefined zones between the inner diameter and outer diameter tracks. The data rate can be increased at the outer diameter tracks due to the increase in circumferential recording area and the decrease in intersymbol interference. This allows more data to be stored in the outer diameter tracks as is illustrated in FIG. 2A where the disk is partitioned into an outer zone 20 comprising fourteen data sectors per track, and an inner zone 22 comprising seven data sectors per track. In practice, the disk is actually partitioned into several zones with increasing data rates from the inner to outer diameter zones.

Figure 2B:
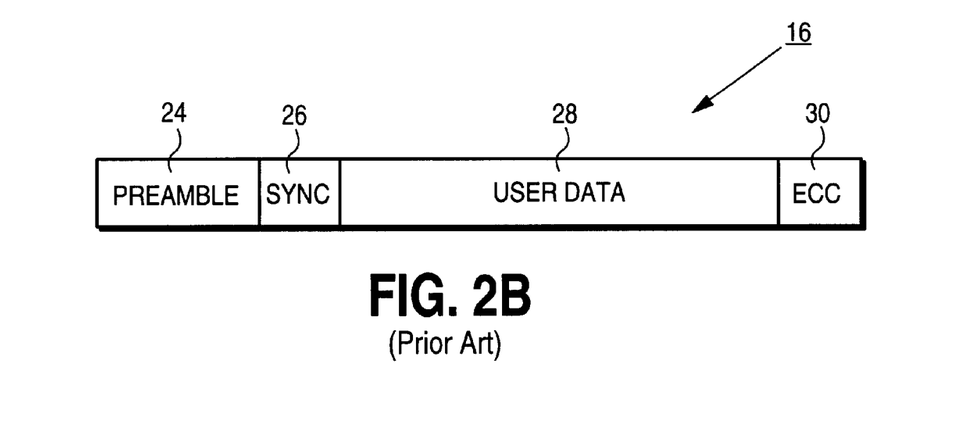
FIG. 2B shows a typical format for a data sector.

FIG. 2B shows the format of a data sector 16 comprised of an acquisition preamble 24, a sync mark 26, a user data field 28, and appended ECC bytes 30 for use in detecting and correcting errors in the user data upon readback. Timing recovery 68 of FIGS. 3A and 3B processes the acquisition preamble 24 to acquire the correct data frequency and phase before reading the user data field 28, and the sync mark 26 demarks the beginning of the user data field 28 for use in symbol synchronizing the user data 28.

Sampled Amplitude Read Channel

Figure 3A:
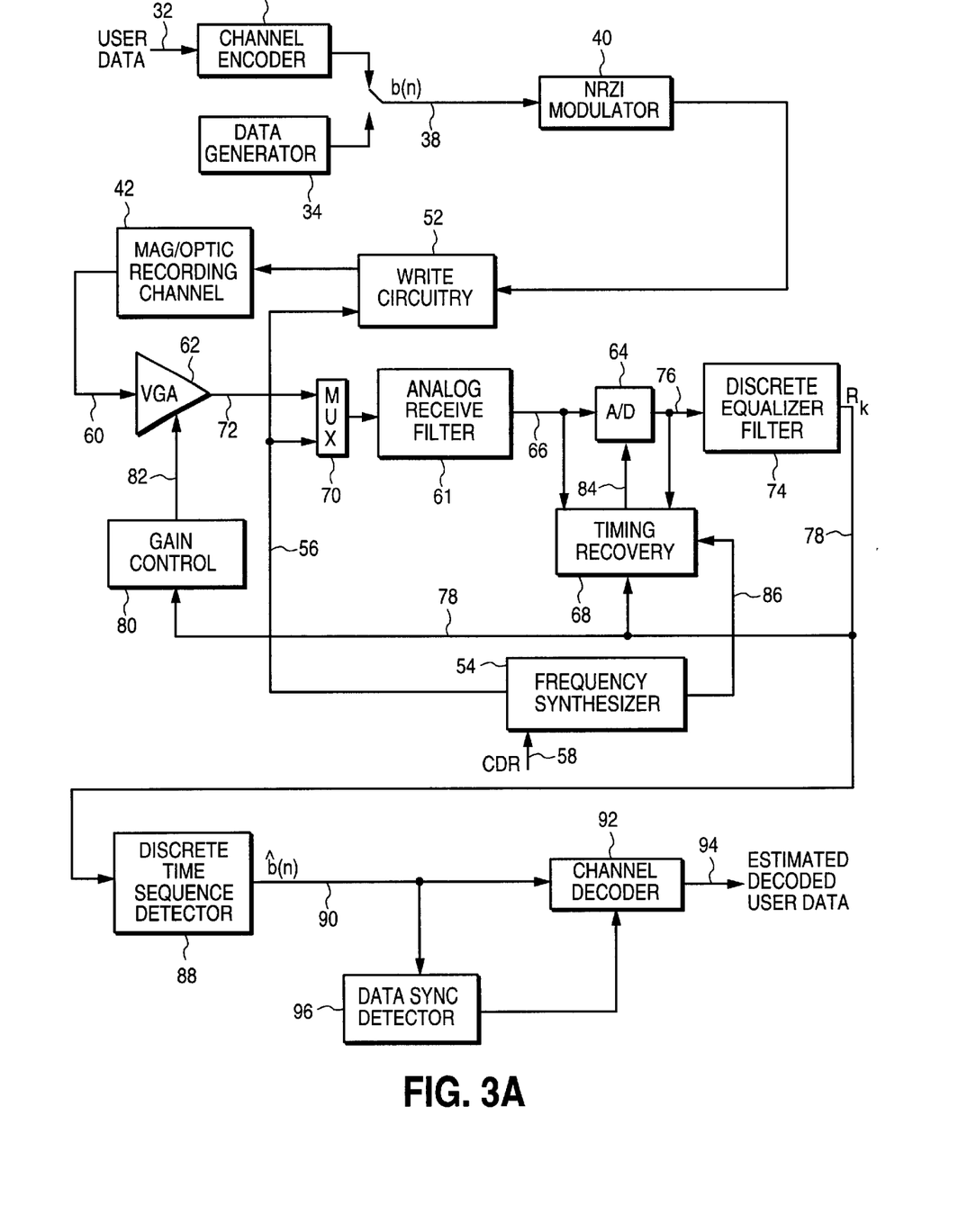
FIG. 3A shows a block diagram of a sampled amplitude read channel employing a discrete-time sequence detector matched to the 2, 2, 1 PR target of FIG. 1B.

Referring now to FIG. 3A, shown is a block diagram of a sampled amplitude read channel according to an embodiment of the present invention. During a write operation, the read channel receives user data over line 32 from the host system. A data generator 34 generates the preamble 24 of FIG. 2B (for example 2T preamble data) written to the disk prior to writing the user data 28. The data generator 34 also generates the sync mark 26 of FIG. 2B for use in symbol synchronizing to the user data 28 during a read operation. A channel encoder 36 encodes a channel code into the data sequence b(n) 38 which is written to the disk; a suitable channel encoder 36 encodes the user data to enforce a run-length-limited (RLL) (d,k) constraint.

After encoding 36 the channel code, a NRZI modulator 40 modulates the current of write circuitry 52, thereby modulating the current in the recording head coil (or intensity of a laser beam) at the zone baud rate to record a sequence of transitions onto the disk 42 which represent the recorded data. In NRZI recording, for each "1" bit in the write data sequence b(n) 38 the NRZI modulator 40 toggles the write current (from positive to negative, or vise versa), and for each "0" bit in the write data sequence b(n) 38 the NRZI modulator 40 leaves the write current unchanged. A frequency synthesizer 54 provides a baud rate write clock 56 to the write circuitry 52 which is adjusted by a baud or channel data rate signal (CDR) 58 according to the current zone the recording head is over.

When reading the recorded binary sequence from the disk storage medium 42, a timing recovery circuit 68 first locks to the write frequency of the zone by selecting, as the input to the read channel, the write clock 56 through a multiplexer 70. Once locked to the write frequency, which is the nominal sampling frequency, the multiplexer 70 selects the signal 72 from the read head as the input to the read channel in order to acquire the acquisition preamble 24 recorded on the disk prior to the recorded user data 28 as shown in FIG. 2B. A variable gain amplifier 62 adjusts the amplitude of the analog read signal 60, and an analog receive filter 61 provides initial equalization toward the desired response as well as attenuating aliasing noise. A sampling device 64 samples the analog read signal 66 from the analog filter 61, and a discrete-time equalizer filter 74 provides further equalization of the sample values 76 toward the 2, 2, 1 PR target of FIG. 1B. The discrete-time equalizer filter 74 may be implemented as a real-time adaptive filter which compensates for parameter variations over the disk radius (i.e., zones), disk angle, and environmental conditions such as temperature drift.

After equalization, the equalized sample values $R_k$ 78 are applied to a decision directed gain control 80 and timing recovery 68 circuit for adjusting the amplitude of the read signal 60 and the frequency and phase of the sampling device 64, respectively. Gain control 80 adjusts the gain of variable gain amplifier 62 over line 82 in order to match the magnitude of the channel's frequency response to the desired PR target, and timing recovery 68 adjusts the frequency of sampling device 64 over line 84 in order to synchronize the equalized samples 78 to the baud rate. Frequency synthesizer 54 provides a course center frequency setting to the timing recovery circuit 68 over line 86 in order to center the timing recovery frequency over temperature, voltage, and process variations. An alternative embodiment for synchronizing the read signal samples to the baud rate is to sample the analog read signal 66 asynchronously and to interpolate the asynchronous sample values to synchronous sample values as described in the above referenced U.S. Pat. No. 5,771,127, "A SAMPLED AMPLITUDE READ CHANNEL EMPLOYING INTERPOLATED TIMING RECOVERY AND A REMOD/DEMOD SEQUENCE DETECTOR."

The sampling device 64 is shown in FIG. 3A as an analog-to-digital (A/D) converter. However, those skilled in the art understand that the sampling device 64 could be a simple sample and hold circuit for converting the analog read signal 66 into a sequence of discrete-time analog samples, and the downstream circuitry, such as the discrete-time equalizer filter 74, timing recovery 68, gain control 80, etc., could be implemented using conventional discrete-time analog (DTA) circuitry. In an alternative embodiment the read channel could be implemented using a hybrid of DTA and digital circuits; for example, the discrete-time equalizer filter 74 could be implemented using DTA, the equalized sample values 78 converted to digital values, and the sequence detector 88 implemented using digital circuitry.

The synchronous, equalized channel samples 78 are ultimately input into a discrete-time sequence detector 88 which detects an estimated sequence b̂(n) 90 from the channel samples 78. The estimated data sequence b̂(n) 90 is decoded by a channel decoder 92 which implements the inverse operation of the channel encoder 36 to thereby generate an estimated user data sequence 94. A data sync detector 96 detects the sync mark 26 (shown in FIG. 2B) in the data sector 16 in order to frame operation of the channel decoder 92.

Figure 3B:
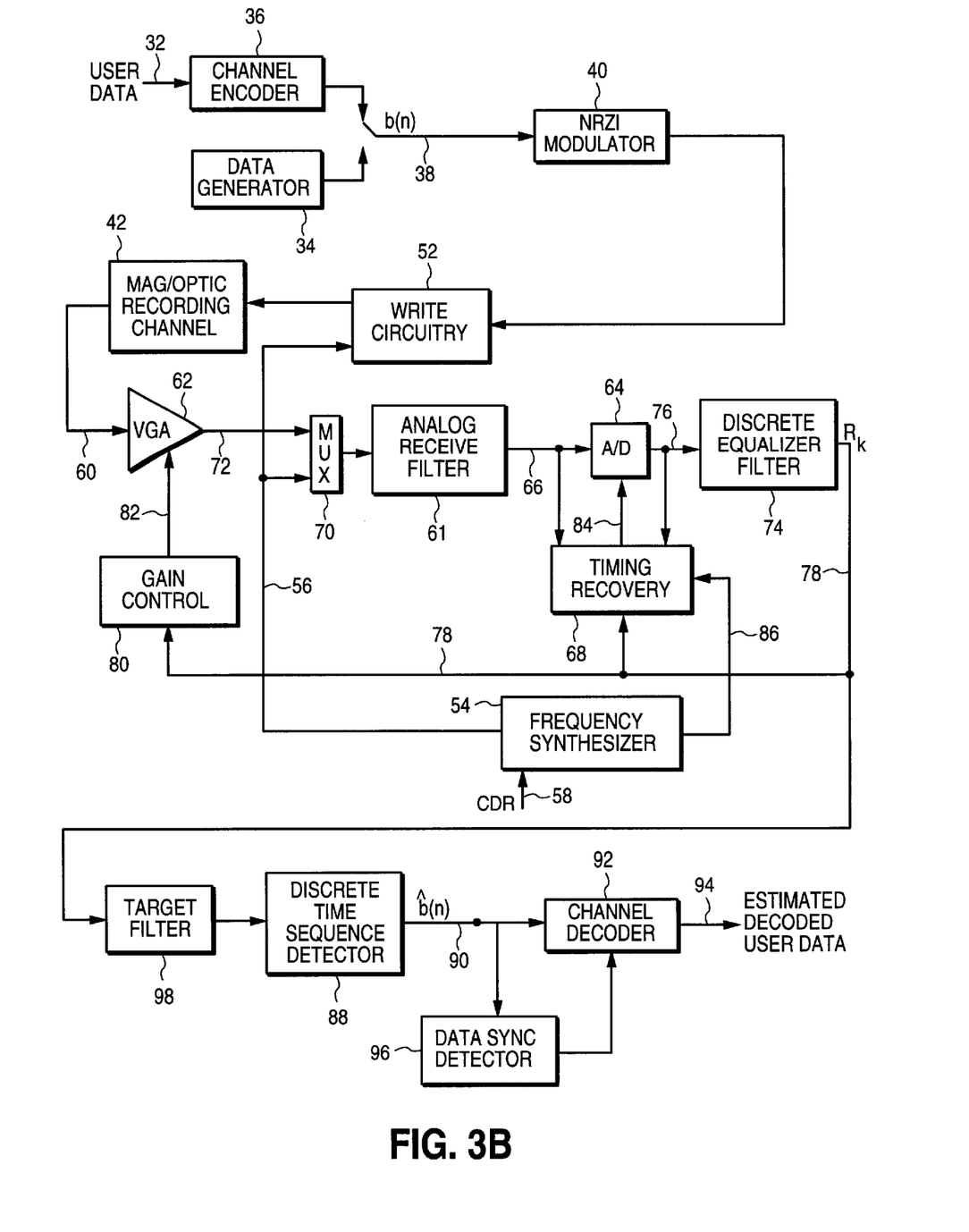
FIG. 3B shows an alternative embodiment of the present invention wherein the read signal samples are first equalized according to a PR4 target in order to simplify timing recovery and gain control, and then equalized by a target filter according to the 2, 2, 1 PR target of FIG. 1B.

In an alternative of the present invention, as shown in FIG. 3B, the discrete-time equalizer 74 equalizes the sample values 76 into a PR4 response so that a simple slicer circuit (not shown) can generate estimated sample values for use in the timing recovery 68 and gain control 80 decision-directed feedback loops. The PR4 equalized samples 78 are then passed through a target filter 98 to generate target samples according to the 2, 2, 1 PR target of FIG. 1B. The target filter 98 may be implemented using fixed integer coefficients or it may be implemented using adaptable real coefficients. For example, the discrete-time equalizer filter 74 may comprise a plurality of adaptive real coefficients for equalizing the read signal samples 76 according to the PR4 target having a transfer function of $(1-D^2)$ to generate PR4 samples, and the target filter 98 may comprise three integer coefficients implementing the transfer function $(2+2D+D^2)$ for equalizing the PR4 samples according to the desired 2, 2, 1 PR target. Alternatively, the target filter 98 may comprise a plurality of real coefficients similar to the discrete-time equalizer 74 which provides more flexibility in attaining the desired 2, 2, 1 PR target. For implementation details concerning various alternative embodiments for sample value estimation for timing recovery 68 and gain control 80, see the above referenced U.S. Pat. No. 5,585,975, "EQUALIZATION FOR SAMPLE VALUE ESTIMATION AND SEQUENCE DETECTION IN A SAMPLED AMPLITUDE READ CHANNEL."

Discrete-Time Sequence Detector

Figure 4A:
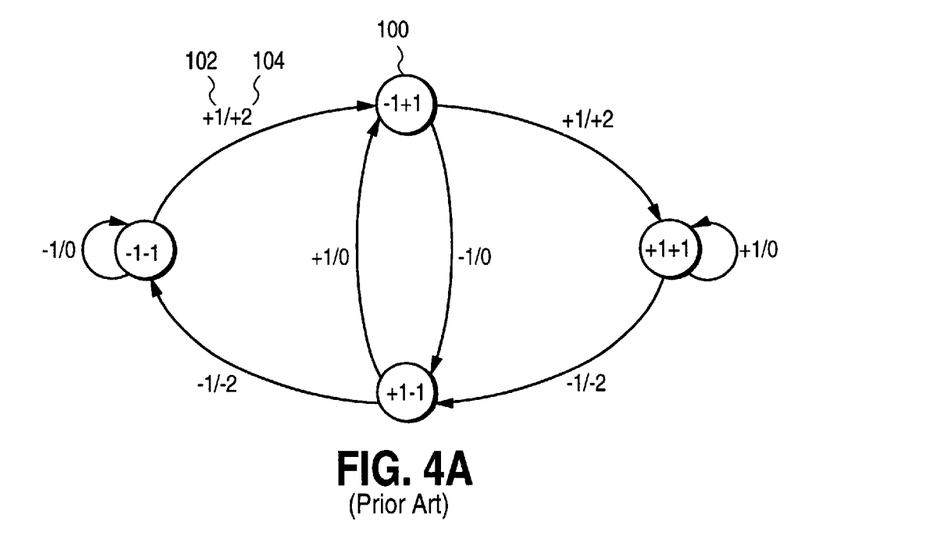
FIG. 4A is a state transition diagram for a conventional PR4 sequence detector.

The general operation of the discrete-time sequence detector 88 shown in FIG. 3A and 3B is understood from the state transition diagram for a simple PR4 sequence detector shown in FIG. 4A. Each state 100 is represented by the last two input symbols in the NRZ domain (a "1" bit corresponds to a positive write current and a "0" bit corresponds to a negative write current), and each branch from one state to another is labeled with the current input symbol in NRZ 102 and the corresponding sample value 104 it will produce during readback. The demodulation process of the PR4 sequence detector is understood by representing the state transition diagram of FIG. 4A as a trellis diagram shown in FIG. 4B. The trellis diagram represents a time sequence of sample values and the possible recorded input sequences that could have produced the sample sequence. For each possible input sequence, an error metric is computed relative to a difference between the sequence of expected sample values that would have been generated in a noiseless system and the actual sample values output by the channel. For instance, a Euclidean metric is computed as the accumulated square difference between the expected and actual sample values. The input sequence that generates the smallest Euclidean metric is the most likely sequence to have created the actual sample values because it is the "closest" valid sequence to the actual sample values; this sequence is therefore selected as the output of the sequence detector.

Figure 4B:
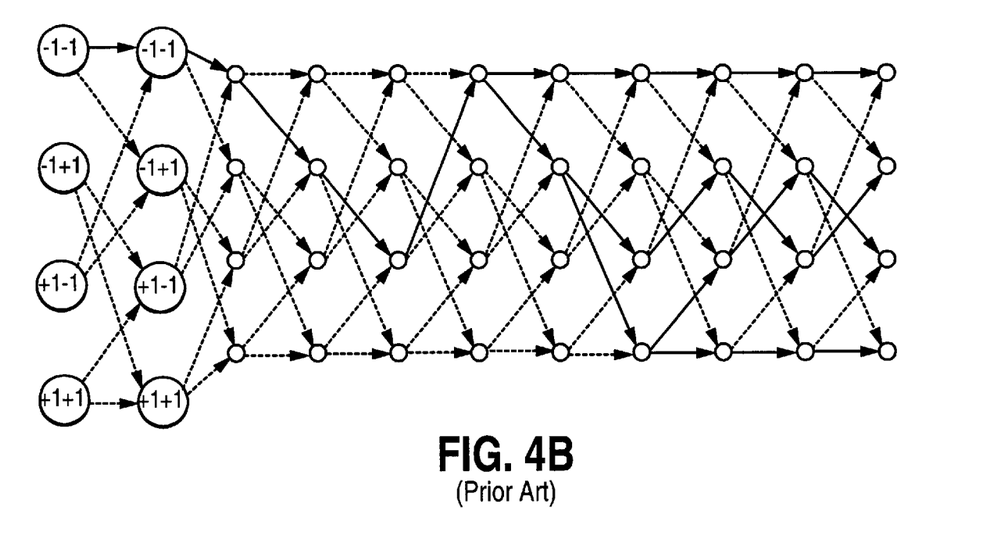
FIG. 4B is a trellis diagram corresponding to the PR4 state transition diagram of FIG. 4A showing the path memory and survivor sequence for a given input sequence.

To facilitate the demodulation process, the sequence detector comprises path memories for storing each of the possible input sequences and a corresponding metric. A well known property of the sequence detector is that the paths storing the possible input sequences will "merge" into a most likely input sequence after a certain number of sample values are processed, as long as the input sequence is appropriately constrained through use of a channel code. In fact, the maximum number of path memories needed equals the number of states in the trellis diagram; the most likely input sequence will always be represented by one of these paths, and these paths will eventually merge into one path (i.e., the most likely input sequence) after a certain number of sample values are processed.

The "merging" of path memories is understood from the trellis diagram of FIG. 4B where the "survivor" sequences are represented as solid lines. Notice that each state in the trellis diagram can be reached from one of two states; that is, there are two transition branches leading to each state. With each new sample value, the Viterbi algorithm recursively computes a new error metric and retains a single survivor sequence for each state corresponding to the minimum error metric. In other words, the Viterbi algorithm will select one of the two input branches into each state since only one of the branches will correspond to the minimum error metric, and the paths through the trellis corresponding to the branches not selected will merge into the paths that were selected. Eventually, all of the survivor sequences will merge into one path through the trellis which represents the most likely estimated data sequence to have generated the sample values as shown in FIG. 4B.

In some cases, if the input sequence is not appropriately constrained through the use of a channel code, the path memories will not merge into one survivor sequence. Consider the PR4 trellis shown in FIG. 4B; an input sequence of all zeros or all ones will prevent the paths from merging which leads to multiple possible survivor sequences output by the detector. Data sequences which prevent the path memories from merging are referred to as "quasi-catastrophic" data sequences since they result in quasi-catastrophic errors in the output sequence. In order to avoid quasi-catastrophic errors, a channel code is typically employed which codes out of the recorded data all sequences which can prevent the path memories from merging.

Even if the quasi-catastrophic data sequences are coded out of the input sequence, the sequence detector can still make an error in detecting the output sequence if enough destructive noise is present in the read signal. The possible output sequences are different from one another by a minimum Euclidean distance; a detection error typically occurs when the signal noise breaches this minimum distance between valid output sequences. A minimum distance error event can occur where the data sequences diverge from a particular state in the trellis and then remerge at a later state. In a perfect system, all of the minimum distance error events will occur with equal probability. However, because the channel equalizers correlate the noise in the read signal samples, the minimum length, minimum distance error events are more likely to occur. Further, depending on the partial response polynomial and recording density employed, error events other than the minimum distance error events may become the most dominant.

2, 2, 1 State Transition Diagram The 2, 2, 1 PR target of FIG. 1B works well for channel densities of 2.25 to 3.0 (number of channel bits per pulse width at half maximum) meaning that it requires less equalization to match the channel's response to the 2, 2, 1 PR target. In fact, it is almost ideal for minimum bandwidth 50/50 Lorentzian/Gausian at channel density 2.7, and for minimum bandwidth Lorentzian at channel density 3.4.

Figure 5:
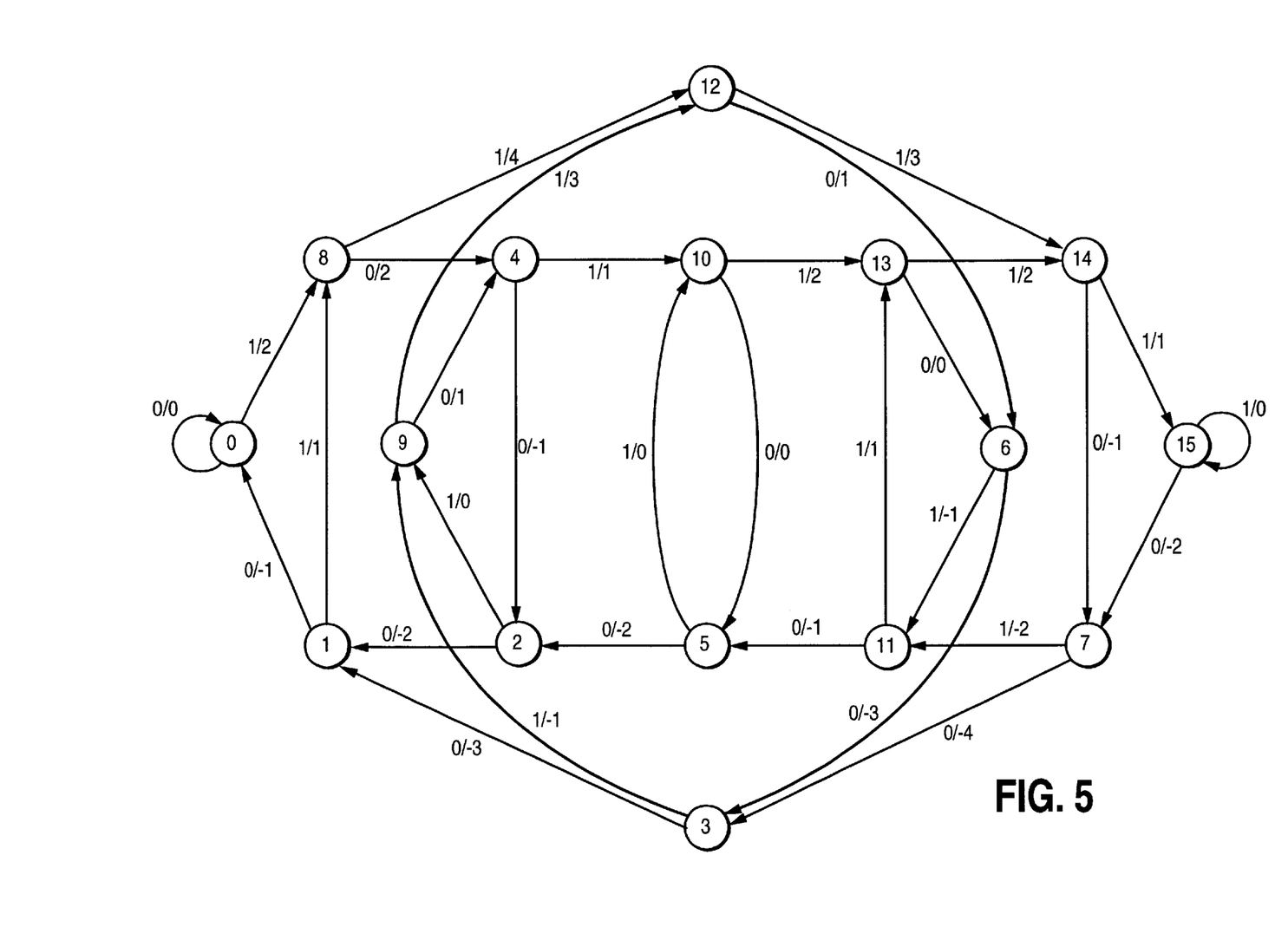
FIG. 5. is a state transition diagram for the discrete-time sequence detector of FIG. 3A or 3B matched to the 2, 2, 1 PR target.

The state transition diagram for the 2, 2, 1 PR target is shown in FIG. 5. It is generated by considering the channel output for the $2^4$ possible combinations of a dipulse response comprising five samples, and in the embodiment shown in FIG. 5, a dipulse response of the form:

$$( \ldots, 0, 0, +2, +2, -1, -2, -1, 0, 0, \ldots ).$$

Those skilled in the art understand how to implement a discrete-time sequence detector that would operate according to the state transition diagram shown in FIG. 5. An example embodiment of a sequence detector implementing an EEPR4 target is disclosed in the above referenced U.S. Pat. No. 5,291,499 entitled "METHOD AND APPARATUS FOR REDUCED-COMPLEXITY VITERBI-TYPE SEQUENCE DETECTORS."

The objects of the invention have been fully realized through the embodiments disclosed herein. Those skilled in the art will appreciate that the various aspects of the invention can be achieved through different embodiments without departing from the essential function. For example, the shape of the dipulse response need only match in general the shape of the 2, 2, 1 dipulse response shown in FIG. 1B in order to realize its benefits. Further, the sample values for the dipulse response may be scaled differently, and/or may deviate from that shown in FIG. 1B in order to fine tune the response to a particular operating environment (e.g., recording density, medium, head, etc.). The disclosed embodiments are thus illustrative and not intended to limit the scope of the present invention as appropriately construed from the following claims.

We claim:

1. A sampled amplitude read channel for reading data recorded on a disk storage medium by detecting an estimated data sequence from a sequence of read signal sample values generated by sampling an analog read signal emanating from a read head positioned over the disk storage medium, the sampled amplitude read channel comprising:

(a) a sampling device for sampling the analog read signal to generate the read signal sample values;

(b) a discrete-time equalizer for equalizing the read signal sample values according to an asymmetric partial response target comprising a dipulse response of the form:

$$(\ldots 0, 0, +2, +2, -1, -2, -1, 0, 0, \ldots)$$

to thereby generate equalized sample values; and (c) a discrete-time sequence detector for detecting the estimated data sequence from the equalized sample values.

2. The sampled amplitude read channel as recited in claim 1, wherein the discrete-time equalizer comprises:

(a) a PR4 equalizer for equalizing the read signal sample values according to a PR4 partial response to generate PR4 sample values processed by a timing recovery circuit; and (b) a target filter for equalizing the PR4 sample values according to a $(2+2D+D^2)$ transfer function for generating the equalized sample values.

3. A sampled amplitude read channel for reading data recorded on a disk storage medium by detecting an estimated data sequence from a sequence of read signal sample values generated by sampling an analog read signal emanating from a read head positioned over the disk storage medium, the sampled amplitude read channel comprising:

(a) a sampling device for sampling the analog read signal to generate the read signal sample values;

(b) a discrete-time equalizer for equalizing the read signal sample values according to an asymmetric partial response target comprising a dipulse response of the form:

$$(\ldots, 0, 0, +X_0, +X_1, -X_2, -X_3, -X_4, 0, 0, \ldots)$$

where $X_0$–$X_4$ are non-zero to thereby generate equalized sample values; and (c) a discrete-time sequence detector for detecting the estimated data sequence from the equalized sample values.

4. The sampled amplitude read channel as recited in claim 3, wherein $X_0$–$X_4$ are 2, 2, 1, 2, 1 respectively.

5. The sampled amplitude read channel as recited in claim 4, wherein the discrete-time equalizer comprises:

(a) a PR4 equalizer for equalizing the read signal sample values according to a PR4 partial response to generate PR4 sample values processed by a timing recovery circuit; and (b) a target filter for equalizing the PR4 sample values according to a $(2+2D+D^2)$ transfer function for generating the equalized sample values.

6. A sampled amplitude read channel for reading data recorded on a disk storage medium by detecting an estimated data sequence from a sequence of read signal sample values generated by sampling an analog read signal emanating from a read head positioned over the disk storage medium, the sampled amplitude read channel comprising:

(a) a sampling device for sampling the analog read signal to generate the read signal sample values;

(b) a PR4 equalizer for equalizing the read signal sample values according to a PR4 partial response to generate PR4 sample values processed by a timing recovery circuit;

(c) a timing recovery circuit for extracting timing information from the PR4 sample values;

(d) a target filter for equalizing the PR4 sample values according to an asymmetric partial response target comprising a dipulse response of the form:

$$(\ldots, 0, 0, +X_0, +X_1, -X_2, -X_3, -X_4, 0, 0, \ldots)$$

where $X_0$–$X_4$ are non-zero to thereby generate equalized sample values; and (e) a discrete-time sequence detector for detecting the estimated data sequence from the equalized sample values.

7. The sampled amplitude read channel as recited in claim 6, wherein $X_0$–$X_4$ are 2, 2, 1, 2, 1 respectively.

8. A method of reading data recorded on a disk storage medium by detecting an estimated data sequence from a sequence of read signal sample values generated by sampling an analog read signal emanating from a read head positioned over the disk storage medium, comprising the steps of:

(a) sampling the analog read signal to generate the read signal sample values;

(b) equalizing the read signal sample values according to an asymmetric partial response target comprising a dipulse response of the form:

$$(\ldots, 0, 0, +X_0, +X_1, -X_2, -X_3, -X_4, 0, 0, \ldots)$$

where $X_0$–$X_4$ are non-zero to thereby generate equalized sample values; and (c) detecting the estimated data sequence from the equalized sample values.

9. The method of reading data as recited in claim 8, wherein $X_0$–$X_4$ are 2, 2, 1, 2, 1 respectively.

10. The method of reading data as recited in claim 9, wherein the step of equalizing comprises the steps of:

(a) equalizing the read signal sample values according to a PR4 partial response to generate PR4 sample values processed by a timing recovery circuit; and (b) equalizing the PR4 sample values according to a $(2+2D+D^2)$ transfer function for generating the equalized sample values.

11. A sampled amplitude read channel for use in communication systems, comprising:

(a) a sampling device for sampling an analog receive signal to generate signal sample values;

(b) a discrete-time equalizer for equalizing the signal sample values according to an asymmetric partial response target comprising a dipulse response of the form:

$$(\ldots, 0, 0, +X_0, +X_1, -X_2, -X_3, -X_4, 0, 0, \ldots)$$

where $X_0$–$X_4$ are non-zero to thereby generate equalized sample values; and (c) a discrete-time sequence detector for detecting an estimated data sequence from the equalized sample values.

12. The sampled amplitude read channel as recited in claim 11, wherein $X_0$–$X_4$ are 2, 2, 1, 2, 1 respectively.

13. The sampled amplitude read channel as recited in claim 12, wherein the discrete-time equalizer comprises:

(a) a PR4 equalizer for equalizing the signal sample values according to a PR4 partial response to generate PR4 sample values processed by a timing recovery circuit; and (b) a target filter for equalizing the PR4 sample values according to a $(2+2D+D^2)$ transfer function for generating the equalized sample values.

* * * * *